US009209853B1

(12) United States Patent
Nohalty et al.

(10) Patent No.: US 9,209,853 B1
(45) Date of Patent: *Dec. 8, 2015

(54) RADIO PORT SWITCHING DEVICE AND METHOD OF USING THE RADIO PORT SWITCHING DEVICE

(71) Applicant: SPRINT COMMUNICATION COMPANY L.P., Overland Park, KS (US)

(72) Inventors: Greg Nohalty, Overland Park, KS (US); Maneesh Gauba, Overland Park, KS (US); Stephen R. Bales, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/094,169

(22) Filed: Dec. 2, 2013

(51) Int. Cl.
*H04B 1/44* (2006.01)
*H04B 1/401* (2015.01)

(52) U.S. Cl.
CPC . *H04B 1/44* (2013.01); *H04B 1/401* (2013.01)

(58) Field of Classification Search
CPC ..... H04W 24/02; H04W 24/04; H04W 88/00; H04W 88/085; H04W 40/00; H04W 56/0045; H04W 56/0055; H04W 88/08; H04B 7/024; H04B 7/0452; H04B 7/0691; H04B 17/12; H04B 17/14; H04B 17/17; H04B 17/21; H04B 1/0475; H04B 1/401; H04B 7/04; H04B 7/0604; H04B 7/0608; H04B 7/0671

See application file for complete search history.

(56) References Cited

U.S. PATENT DOCUMENTS

| 2010/0234035 A1* | 9/2010 | Fujishima et al. ............. 455/450 |
| 2012/0038513 A1* | 2/2012 | Li et al. ........................ 342/372 |
| 2014/0071912 A1* | 3/2014 | Hou et al. ...................... 370/329 |
| 2014/0194113 A1* | 7/2014 | Ahlstrom et al. ............. 455/423 |

* cited by examiner

*Primary Examiner* — Golam Sorowar

(57) ABSTRACT

A switching device and a method and medium of using the switching device are provided. The switching device is positioned between a remote radio unit (RRU) and an antenna on a base station. The switching device utilizes a plurality of switching cables to couple each radio port of the RRU to each of the antenna ports associated with the antenna. The switching device further comprises one or more switching units that are used to selectively communicatively couple one of the RRU's radio ports to one of the antenna ports using at least one of the switching cables.

20 Claims, 6 Drawing Sheets

RADIO PORT SWITCHING DEVICE AND METHOD OF USING THE RADIO PORT SWITCHING DEVICE

SUMMARY

A high level overview of various aspects of the invention is provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, a switching device and computer-readable media, methods, and systems, for remotely regulating communication between an antenna and a remote radio unit (RRU) of a base station using the switching device. The switching device is interposed between the antenna and the RRU on the base station and comprises a number of switching cables that selectively communicatively couple radio ports associated with the RRU to antenna ports associated with the antenna. In particular, the switching cables are used to couple a given radio port with each of the antenna ports associated with the antenna. In response to a change in status of, for example, a first antenna port that is communicatively coupled to the given radio port via a first switching cable, the switching device may be instructed to cease communicatively coupling the given radio port to the first antenna port and, instead, to communicatively couple the given radio port to one of the other antenna ports using a second switching cable. The ability to remotely regulate which antenna port is communicating with a given radio port using a switching device eliminates the need to immediately send a work crew out to the base station in the event of, for example, an antenna port failure.

BRIEF DESCRIPTION OF THE DRAWINGS

Illustrative embodiments of the present invention are described in detail below with reference to the attached drawing figures, and wherein.

DETAILED DESCRIPTION

Figure 1:
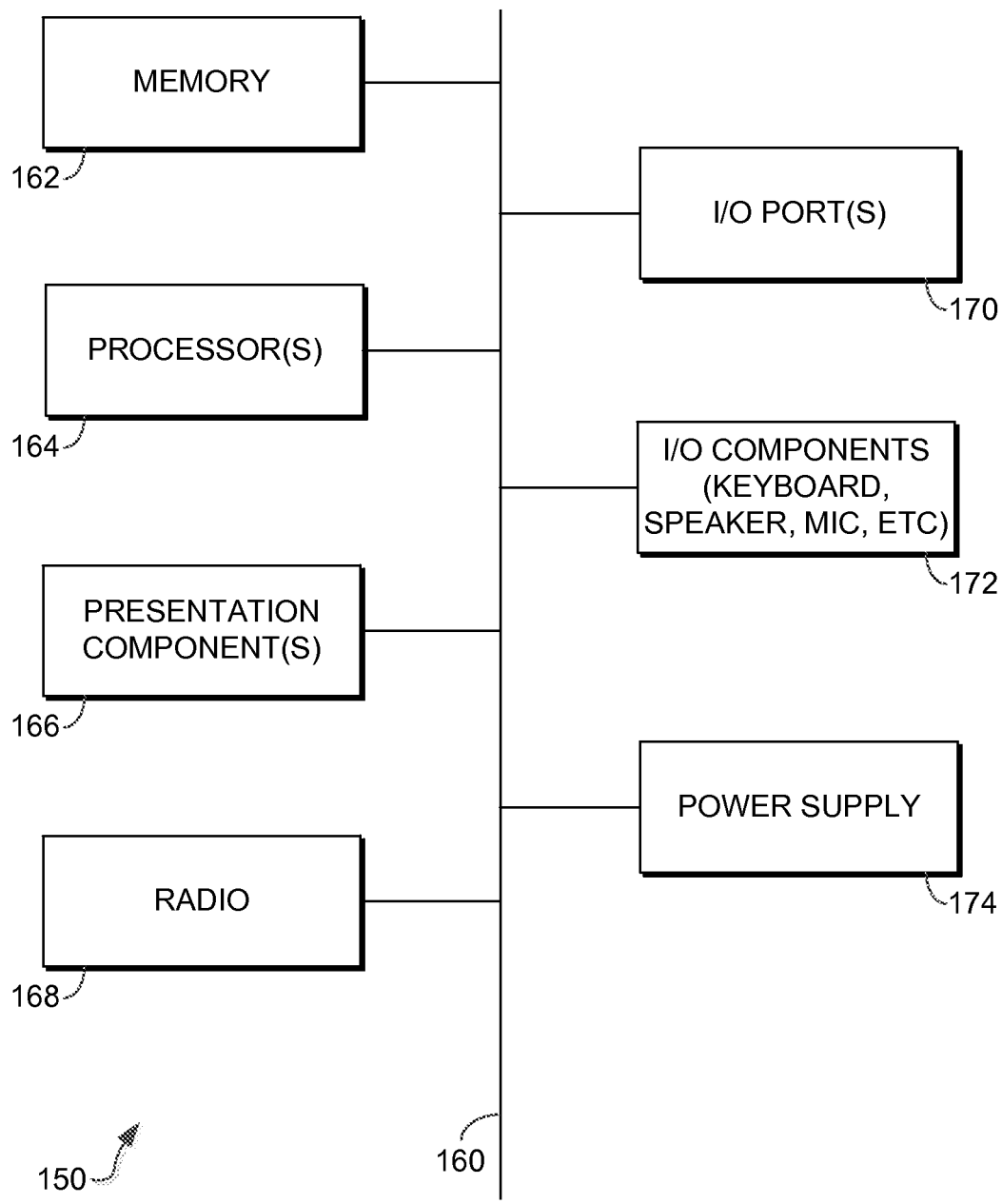
FIG. 1 depicts an exemplary mobile device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BBU Baseband Unit
BF Beam forming
BS Base Station
CDMA Code Division Multiple Access
eNodeB Evolved Node B
GIS Geographic Information System
2GPP $2^{nd}$ Generation Partnership Project
3GPP $3^{rd}$ Generation Partnership Project
GPRS General Packet Radio Service
GSM Global System for Mobile Communications
LTE Long-Term Evolution
RF Radio-Frequency
RRU Remote Radio Unit
UE User Equipment
WCDMA Wideband Code Division Multiple Access Further, various technical terms are used throughout this description. An illustrative resource that fleshes out various aspects of these terms can be found in Newton's Telecom Dictionary, $27^{th}$ Edition (2012).

Embodiments of the present invention may be embodied as, among other things, a method, system, or set of instructions embodied on one or more non-transitory computer-readable or computer-storage media. Computer-readable media comprises physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to computer-storage media such as information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed towards a switching device interposed between a remote radio unit (RRU) and one or more antennas associated with a base station. The switching device utilizes a plurality of switching cables to communicatively couple the RRU to the one or more antennas. More particularly, the switching device utilizes the switching cables to couple each radio port of the RRU to all of the antenna ports associated with the one or more antennas. The switching device further comprises one or more switching units that are used to selectively communicatively couple one of the RRU's radio ports to one of the antenna ports using at least one of the switching cables.

Examples of the present invention are also directed to computer-readable media, methods, and systems, for remotely regulating communication between the one or more antennas and the RRU of the base station using the switching device. Each of the antenna ports is monitored, and a change in status of, for example, a first antenna port is detected. In response to the change in status of the first antenna port, the switching device is instructed to cease to communicatively coupling the first antenna port to its corresponding radio port and, instead, to communicatively couple the radio port to one of the other antenna ports using the switching cables. The ability to remotely switch which antenna port is communicating with a given radio port using a switching device eliminates the need to immediately send a work crew out to the base station in the event of, for example, an antenna port failure. Additionally, using the switching device to couple multiple antennas to a single radio port of a RRU enables the ability to dynamically change antenna types on the fly to meet certain needs as will be explained in greater depth below.

Accordingly, in a first aspect, a switching device comprises a housing unit having an RRU inlet side that has a plurality of radio port connecting terminals. Each radio port connecting terminal is connected to a radio port of a RRU by a data transmission cable. The housing unit further comprises an antenna inlet side having a plurality of antenna port connecting terminals. Each antenna port connecting terminal is connected to an antenna port of an antenna by a data transmission cable. The housing unit also comprises a plurality of sets of switching cables, where each set of switching cables is associated with a radio port connecting terminal. Each switching cable within the set of switching cables connects the respective radio port connecting terminal to one of the plurality of antenna port connecting terminals. Additionally, each switching cable in the set of switching cables comprises one or more switching units for selectively communicatively coupling the respective radio port connecting terminal to the one of the plurality of antenna port connecting terminals.

In a second aspect, a switching device comprises a housing unit that has a RRU inlet side having a plurality of radio port connecting terminals. Each radio port connecting terminal is connected to a radio port of a RRU by a data transmission cable. The housing unit also comprises an antenna inlet side having a plurality of antenna port connecting terminals. Each antenna port connecting terminal is connected to one of a plurality of antennas by a data transmission cable. The housing unit further comprises a plurality of sets of switching cables. Each set of switching cables is associated with a radio port connecting terminal, and each switching cable in the set of switching cables connects the respective radio port connecting terminal to one of the plurality of antenna port connecting terminals. Further, each switching cable in the set of switching cables comprises one or more switching units for selectively communicatively coupling the respective radio port connecting terminal to the one of the plurality of antenna port connecting terminals.

In a third aspect, a computerized method is carried out by at least one server having at least one processor for regulating communication between an antenna and a RRU using a switching device. The antenna comprises a plurality of antenna ports, the RRU comprises a plurality of radio ports, and the switching device communicatively couples the plurality of antenna ports with the plurality of radio ports using a plurality of switching cables. The method comprises monitoring a status of each antenna port and detecting a change in the status of a first antenna port. The first antenna port is communicatively coupled via the switching device to a first radio port of the plurality of radio ports by a first switching cable of the plurality of switching cables. Based on detecting the change in the status of the first antenna port, a first instruction is communicated to the switching device ceases to cease communicatively coupling the first antenna port to the first radio port and, instead, to communicatively couple the first radio port to a second antenna port using a second switching cable of the plurality of switching cables.

Turning now to FIG. 1, a block diagram of an illustrative communications device or UE is provided and is referenced generally by the numeral 150. Although some components are shown in the singular, they may be plural. For example, the communications device 150 might include multiple processors or multiple radios, etc. As illustratively shown, the communications device 150 includes a bus 160 that directly or indirectly couples various components together including memory 162, a processor 164, a presentation component 166, a radio 168, input/output ports 170, input/output components 172, and a power supply 174.

The memory 162 might take the form of memory components previously described. Thus, further elaboration will not be provided here, only to say that the memory component 162 can include any type of medium that is capable of storing information (e.g., a database). A database can be any collection of records. In one embodiment, the memory 162 includes a set of embodied computer-executable instructions that, when executed, facilitates various aspects disclosed herein. These embodied instructions will variously be referred to as "instructions" or an "application" for short.

The processor 164 might actually be multiple processors that receive instructions and process them accordingly. The presentation component 166 includes the likes of a display, a speaker, as well as other components that can present information (such as a lamp (LED), or even lighted keyboards).

The radio 168 facilitates communication with a wireless-telecommunications-network. Illustrative wireless-telecommunications technologies include CDMA, EvDO, GPRS, TDMA, GSM, WiMax technology, LTE, LTE Advanced and the like. In some embodiments, the radio 168 might also facilitate other types of wireless communications including Wi-Fi®, Bluetooth® communications, GIS communications, and other near-field communications.

As way of background, an eNodeB in an LTE telecommunications-network is composed of, among other components, a broadband unit (BBU) that is connected to one or more remote radio units (RRUs). In turn, each RRU is typically connected directly to one or more antenna ports associated with an antenna located on the eNodeB. By way of illustrative example, a 4 port 1900 RRU may be connected to a 4 port 1900 antenna and/or a 2 port 800 RRU may be connected to a 2 port 800 antenna.

Figure 2:
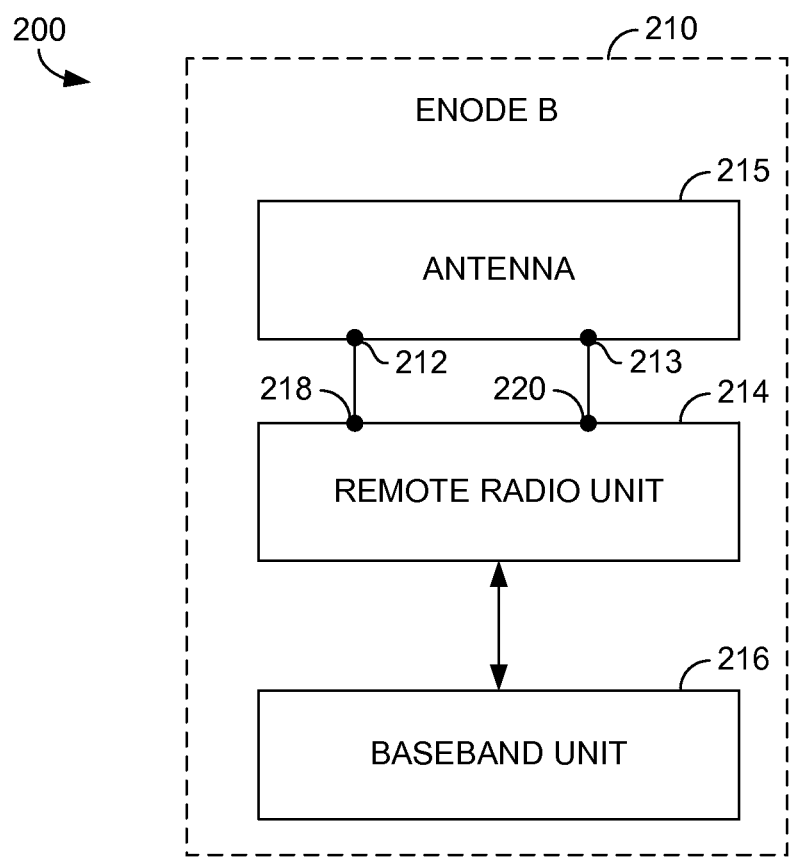
FIG. 2 depicts an exemplary depiction of a typical relationship between an antenna, a remote radio unit, and a baseband unit of a base station.

This typical arrangement is depicted in FIG. 2. FIG. 2 includes an eNodeB 210 having a BBU 216 communicatively coupled to a RRU 214. The RRU 214, in turn, is connected to antenna ports 212 and 213 associated with an antenna 215. More particularly, the RRU 214 comprises one or more radio ports 218 and 220 that are connected directly to the antenna ports 212 and 213 of the antenna 215. Although only two radio ports and two antenna ports are depicted in FIG. 2, it is contemplated that there can be more than two radio ports and more than two antenna ports.

In general, the BBU 216 is responsible for, among other things, digital baseband signal processing. For instance, CDMA/EVDO and LTE Internet protocol (IP) packets are received from the core network (not shown) and are digitally combined by the BBU 216. The blended digital baseband signal is then transmitted to the RRU 214. Digital baseband signals received from the RRU 214 are demodulated by the BBU 216 and the resulting IP packets are then transmitted by the BBU 216 to the core network.

The RRU 214 transmits and receives wireless RF signals. The RRU 214 converts the blended digital signal received from the BBU 216 into an analog RF output via a digital to analog (AD) converter. The analog signal is then amplified by an amplifier in the RRU 214 and sent out for transmission to a UE via the antenna ports 212 and 213 of the antenna 215. The RF signals received from the UE via the antenna ports 212 and 213 are amplified by the RRU 214 and converted to digital baseband signals for transmission to the BBU 216.

As stated earlier, typically each radio port of the RRU 214, such as the radio port 218 and the radio port 220 is connected directly to a single antenna port via some type of RF transmission line. For example, as shown in FIG. 2, the radio port 218 is connected directly to the antenna port 212, and the radio port 220 is connected directly to the antenna port 213. This typical arrangement may cause problems when an antenna port, such as the antenna port 212 experiences problems due to some type of mechanical failure, mis-wiring, interference issue, or the like. In this event, a work crew must physically visit the eNodeB, climb the tower, and either fix the antenna port or re-wire the radio port 218 to a different antenna port. The down time caused by this process can lead to degradation in user service.

Figure 3:
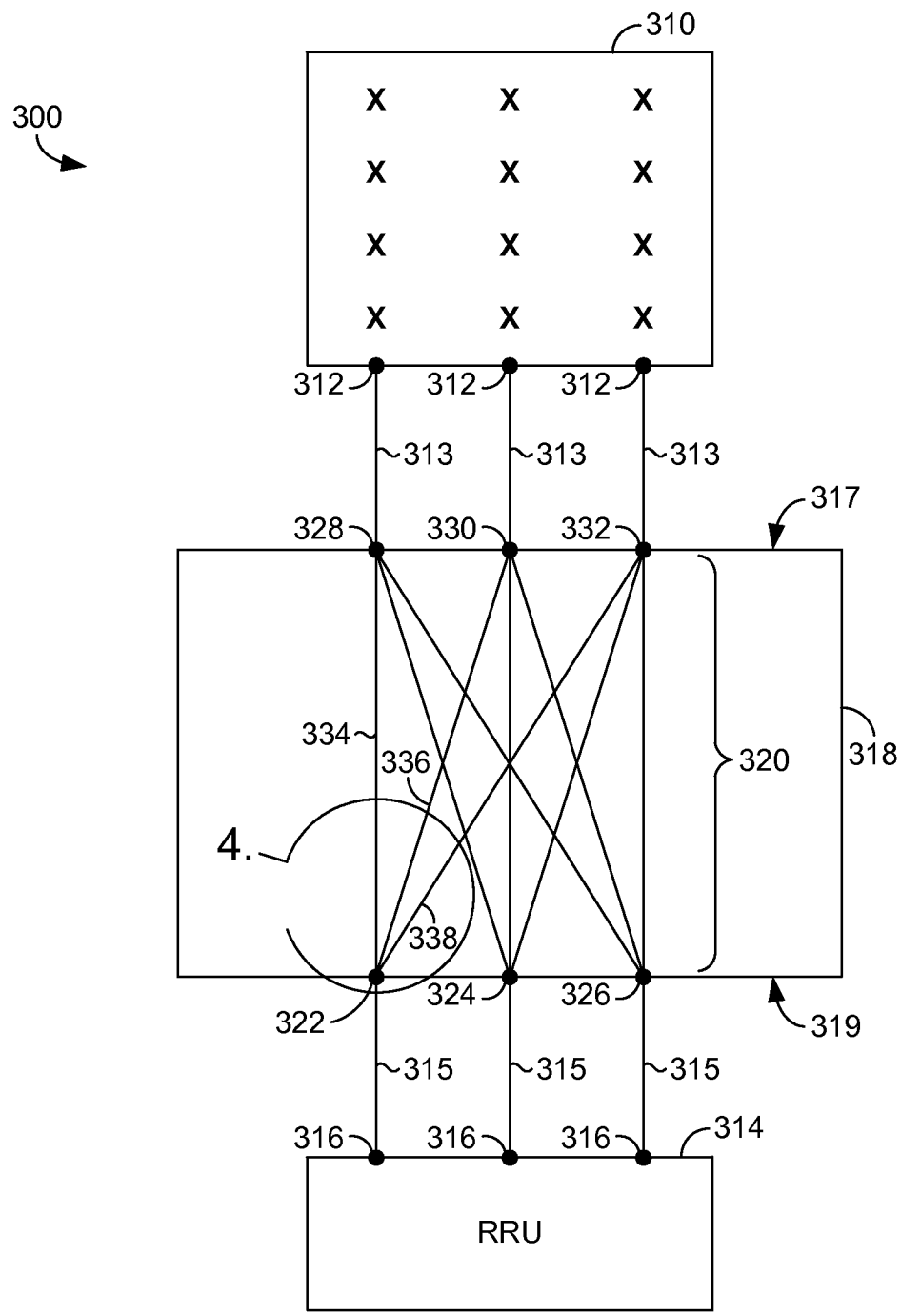
FIG. 3 depicts an exemplary relationship between an antenna, a switching device, and a remote radio unit of a base station suitable for practicing an embodiment of the technology.

In one aspect, the present invention, as shown in FIG. 3 and as referenced generally by the numeral 300, comprises a switching device 318 that is interposed or positioned between an antenna 310 and a RRU 314. The switching device 318, the antenna 310, and the RRU 314 may be associated with a base station or an eNodeB. The antenna 310 may comprise different types of antennas such as a beam forming antenna (shown in FIG. 3), monopole or dipole antennas, parabolic antennas, Yagi antennas, panel antennas, sector antennas, and the like. Like the antenna 215 of FIG. 2, the antenna 310 may comprise one or more antenna ports referenced generally by the numeral 312. Although three antenna ports are shown in FIG. 3, it contemplated that the present invention may encompass more or less than three antenna ports. The RRU 314 comprises a number of radio ports 316 and carries out functions similar to those described above for the RRU 214 of FIG. 2. Although three radio ports are shown in FIG. 3, it is contemplated that the present invention may encompass more or less than three radio ports.

Figure 4:
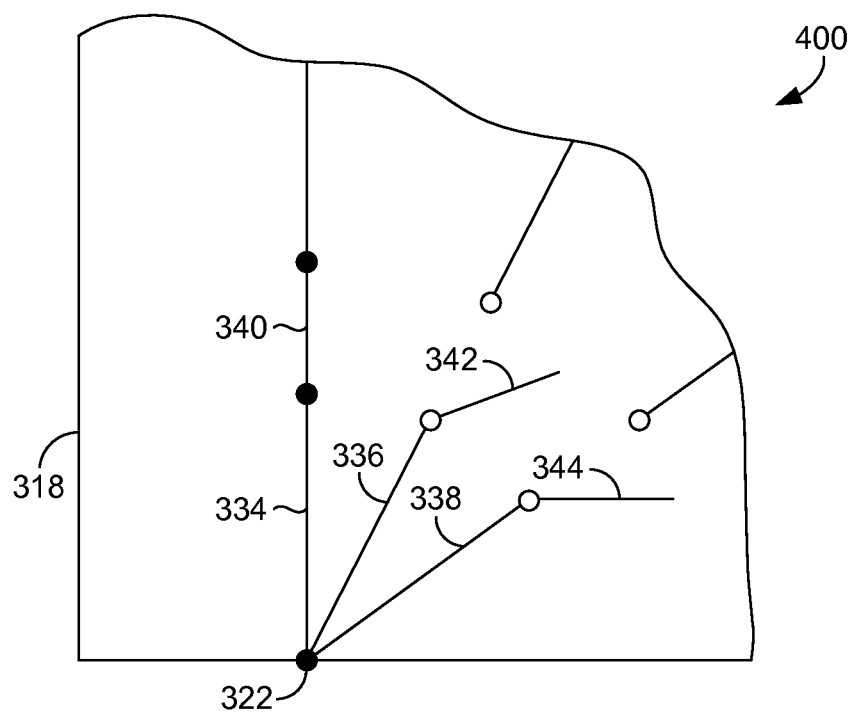
FIG. 4 depicts a close-up view of switching units associated with the switching device of FIG. 3 suitable for practicing an embodiment of the technology.

The switching device 318 comprises a housing unit having an antenna inlet side 317, a RRU inlet side 319, a plurality of switching cables 320, and one or more switching units (shown in more detail in FIG. 4). The antenna inlet side 317 comprises a number of antenna port connecting terminals 328, 330, and 332. As shown in FIG. 3, each of the antenna port connecting terminals 328, 330, and 332 is connected to one of the antenna ports 312 by a RF transmission line 313 (also known as a "data transmission cable"). In one aspect, the RF transmission line 313 may comprise any type of shielded cable such as a coaxial cable. The number of antenna port connecting terminals generally corresponds to the number of antenna ports on the antenna 310 although more or less antenna port connecting terminals are contemplated as being within the scope of the invention.

The RRU inlet side 319 comprises a number of radio port connecting terminals 322, 324, and 326. As shown in FIG. 3, each of the radio port connecting terminals 322, 324, and 326 is connected to one of the radio ports 316 by a RF transmission line 315 (also known as a "data transmission cable"). In one aspect, the RF transmission line 315 may comprise any type of shielded cable such as a coaxial cable. The number of radio port connecting terminals generally corresponds to the number of radio ports on the RRU 314 although more or less radio port connecting terminals are contemplated as being within the scope of the invention. In one aspect of the invention, the antenna inlet side 317 is located on a side of the housing unit opposite the RRU inlet side 319. In other aspects, the antenna inlet side 317 may be located on the same side as the RRU inlet side 319, or the antenna inlet side 317 may be located on a side of the housing unit adjacent to the RRU inlet side 319. Any and all such aspects, and any variation thereof, are contemplated as being within the scope of the invention.

As mentioned, the switching device 318 further comprises the plurality of switching cables 320. The term "switching cables" is used for clarity's sake to distinguish the cabling system within the housing unit of the switching device 318 from the data transmission lines 313 and 315 connecting the antenna ports 312 and the radio ports 316 to the antenna port connecting terminals 328, 330, and 332 and the radio port connecting terminals 322, 324, and 326 respectively. However, like the data transmission lines 313 and 315, the switching cables 320 may comprise any type of RF transmission line such as, for example, coaxial cables.

Each of the radio port connecting terminals 322, 324, and 326 has an associated set of switching cables. Each switching cable within the set connects the respective radio port connecting terminal 322, 324, or 326 to each of the antenna port connecting terminals 328, 330, and 332. Taking the radio port connecting terminal 322 as a representative example, the set of switching cables associated with the radio port connecting terminal 322 includes switching cables 334, 336, and 338. Switching cable 334 connects the radio port connecting terminal 322 to the antenna port connecting terminal 328. Switching cable 336 connects the radio port connecting terminal 322 to the antenna port connecting terminal 330, and switching cable 338 connects the radio port connecting terminal 322 to the antenna port connecting terminal 332.

Each switching cable in the plurality of switching cables 320 includes a switching unit (shown in detail in FIG. 4) that is used to selectively communicatively couple the respective radio port to a given antenna port. As used throughout the application, the term "communicatively couple" means to enable the propagation of a RF signal from the RRU 314 to the antenna 310. At any single moment in time, a given radio port connecting terminal is communicatively coupled to only a single antenna port connecting terminal. A close-up view of the switching units associated with the switching cables 334, 336, and 338 is shown in FIG. 4.

FIG. 4 depicts a close-up view of the radio port connecting terminal 322 of the switching device 318 as indicated on FIG. 3 and is referenced generally by the numeral 400. Each of the switching cables 334, 336, and 338 associated with the radio port connecting terminal 322 includes a switching unit. For instance, switching cable 334 includes switching unit 340, switching cable 336 includes switching unit 342, and switching cable 338 includes switching unit 344. The depiction of the switching units 340, 342, and 344 in FIG. 4 is meant to be illustrative and exemplary only. Other configurations of switching units are contemplated as being within the scope of the invention.

Only one of the switching units associated with a set of switching cable is activated at any given time. For example, in FIG. 4, the switching unit 340 is currently engaged while the switching units 342 and 344 are open. The result is that the radio port connecting terminal 322 is currently communicatively coupled to the antenna port connecting terminal 328 via the switching cable 334 but is not communicatively coupled to the antenna port connecting terminals 330 and 332. The switching units, such as the switching units 340, 342, and 344 may be controlled remotely using standards developed by, for example, the Antenna Interfaces Standards Group (ASIG). As explained in more depth below with respect to FIG. 6, selective switching units may be activated in response to detected changes in the status of one or more of the antenna ports 312.

Figure 5:
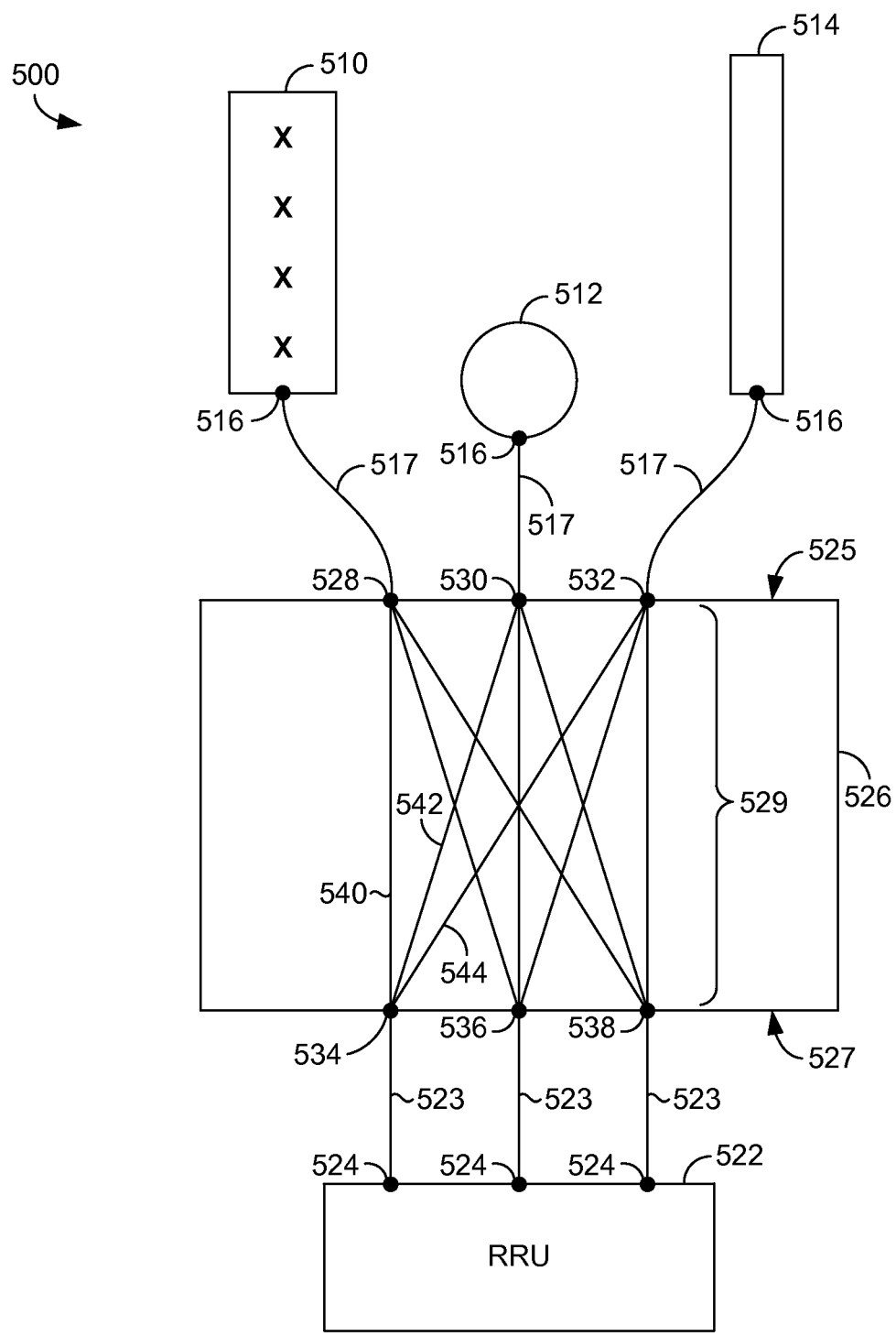
FIG. 5 depicts an exemplary relationship between a plurality of antennas, a switching device, and a remote radio unit of a base station suitable for practicing an embodiment of the technology.

FIG. 5 depicts another embodiment of the present invention and is referenced generally by the numeral 500. Much of the description of FIG. 3 is equally applicable to FIG. 5. FIG. 5 includes a RRU 522, which may be similar to the RRU 314 of FIG. 3, a switching device 526, which may be similar to the switching device 318 of FIG. 3, and antennas 510, 512, and 514. The antennas 510, 512, and 514 may comprise three different antennas that may be of the same type or different types. For instance, the antennas 510, 512, and 514 may comprise one or more of beam forming antennas, monopole or dipole antennas, parabolic antennas, Yagi antennas, panel antennas, sector antennas, and the like. The antennas 510, 512, and 514 may each include one or more antenna ports (depicted generally by the numeral 516). Although three antennas are shown in FIG. 5, it is contemplated that the present invention may include more or less than three antennas.

Like the switching device 318 of FIG. 3, the switching device 526 comprises a housing unit having an antenna inlet side 525, a RRU inlet side 527, a plurality of switching cables 529, and one or more switching units similar to the switching units 340, 342, and 344 of FIG. 4. The antenna inlet side 525 comprises a number of antenna port connecting terminals 528, 530, and 532. As shown in FIG. 5, each of the antenna port connecting terminals 528, 530, and 532 is connected to one of the antenna ports 516 of the antennas 510, 512, and 514 by a data transmission cable 517. The number of antenna port connecting terminals generally corresponds to the number of antenna ports of the antennas 510, 512, and 514 although more or less antenna port connecting terminals are contemplated as being within the scope of the invention.

The RRU inlet side 527 comprises a number of radio port connecting terminals 534, 536, and 538. As shown in FIG. 5, each of the radio port connecting terminals 534, 536, and 538 is connected to one of the radio ports 524 by a data transmission cable 523. The number of radio port connecting terminals generally corresponds to the number of radio ports on the RRU 522 although more or less radio port connecting terminals are contemplated as being within the scope of the invention.

The plurality of switching cables 529 in FIG. 5 comprises three sets of switching cables, where each set is associated with a respective radio port connecting terminal 534, 536, and 538. The number of sets of switching cables generally corresponds to the number of radio port connecting terminals of the switching device 526. Each switching cable within the set connects the respective radio port connecting terminal 534, 536, or 538 to each of the antenna port connecting terminals 528, 530, and 532. For example, radio port connecting terminal 534 is connected to antenna port connecting terminals 528 by switching cable 540, to antenna port connecting terminal 530 by switching cable 542, and to antenna port connecting terminal 532 by switching cable 544.

Each of the plurality of switching cables 529 includes a switching unit similar to those shown in FIG. 4, that is used to selectively communicatively couple the respective radio port to a given antenna port of the antennas 510, 512, and 514. At any given time, a given radio port connecting terminal is communicatively coupled to only a single antenna port connecting terminal.

The arrangement shown in FIG. 5 is useful for changing the type of antenna communicating with the RRU in response to changing needs. The changing needs may include changes in UE traffic or usage associated with a particular antenna. For example, the antenna 512 may be providing coverage to a first geographic area (e.g., an interstate highway in an urban area) that has a high amount of UE traffic during daylight hours, while the antenna 514 provides coverage to a different geographic area (e.g., an entertainment district) that has a high amount of UE traffic during nighttime hours. The arrangement shown in FIG. 5 enables, for example, the radio port connecting terminal 534 to be communicatively coupled to the antenna port connecting terminal 530 of the antenna 512 during daylight hours, and to be communicatively coupled to the antenna port connecting terminal 532 of the antenna 514 during nighttime hours. Other examples of changing needs include a mechanical failure of one of the antennas 510, 512, or 514, or detection that one of the antennas 510, 512, or 514 is pointing in the wrong direction.

Figure 6:
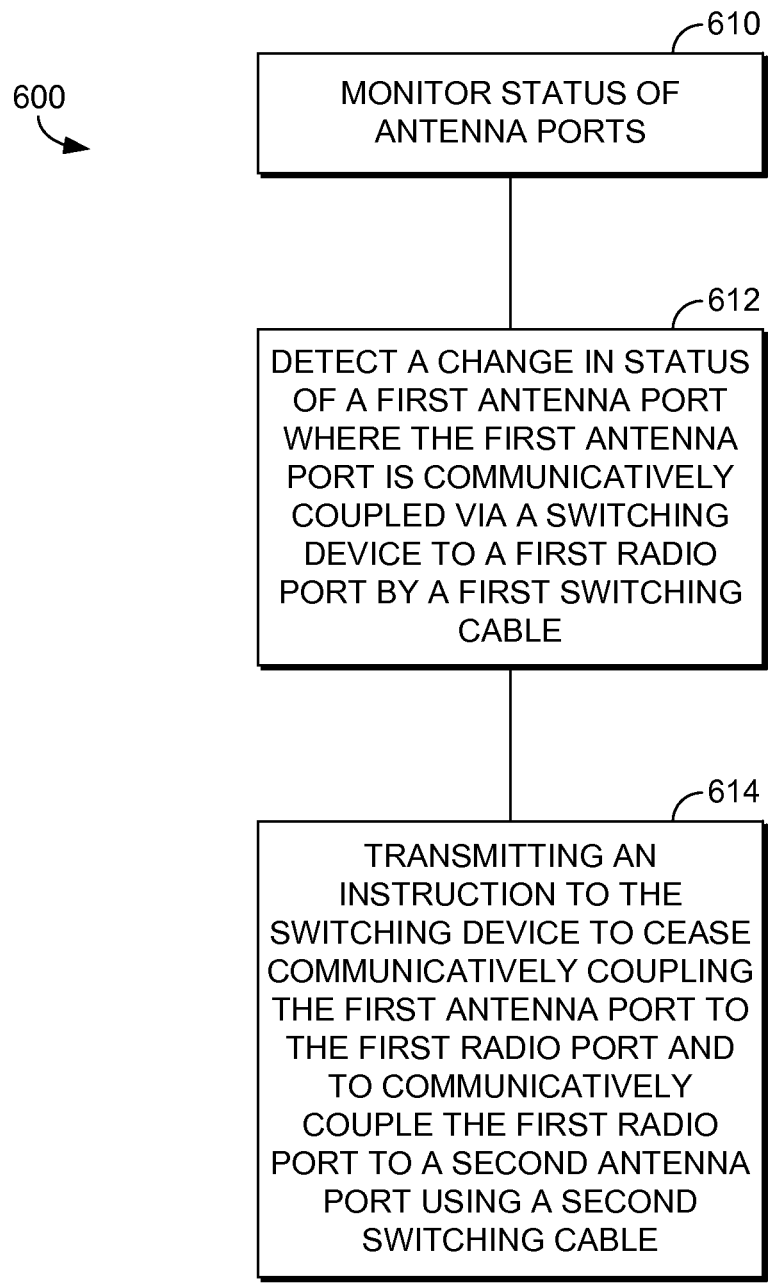
FIG. 6 depicts an illustrative flow diagram of an exemplary method of regulating communication between one or more antennas and a remote radio unit using a switching device according to an embodiment of the technology.

Turning now to FIG. 6, FIG. 6 depicts a flow diagram of an exemplary method 600 of regulating communication of RF signals between an antenna and a RRU using a switching device. The method may be carried out by at least one server having at least one processor. The server may be located in association with the switching device, or, alternatively, the server may be located at a location remote from the switching device such as on the base station or at a location remote from the base station. The antenna may comprise the antenna 310 of FIG. 3. Likewise, the RRU may comprise the RRU 314 of FIG. 3, and the switching device may comprise the switching device 318 of FIG. 3. The antenna, the RRU, and the switching device may be associated with a base station, such as an eNodeB. As explained above, the switching device utilizes a plurality of switching cables to communicatively couple radio ports of the RRU to one or more antenna ports associated with the antenna. At a step 610, a status of each of the antenna ports is monitored. The monitoring may take place a location remote from the base station, or the monitoring may take place at the base station. Monitoring the status of the antenna ports may comprise determining if a particular antenna port is offline or non-functional, determining if a particular antenna port is experiencing significant interference issues, detecting mechanical issues associated with an antenna port such as a mis-wiring issue, determining usage patterns associated with a particular antenna port, determining that the antenna is positioned incorrectly, and the like.

At a step 612, a change in the status of a first antenna port is detected. At the time of detection, the first antenna port is communicatively coupled to a first radio port of the RRU by a first switching cable in the switching device. As mentioned above, the change in status may comprise the first antenna port becoming non-functional due to some type of mechanical issue or interference, the first antenna port going offline or having a change in UE traffic usage, and the like.

At a step 614, in response to the detecting the change in the status of the first antenna port, a communication is transmitted to the switching device instructing it to cease communicatively coupling the first antenna port to the first radio port and, instead, to communicatively couple the first radio port to a different antenna port of the antenna. This may occur by utilizing the switching units, such as the switching units 340, 342, and 344 of FIG. 4, associated with the switching cables of the switching device. For instance, the switching unit associated with the switching cable that connects the first radio port connecting terminal to the first antenna port connecting terminal may be opened which causes disruption of the transmission and/or receipt of the RF signal. Simultaneously, the switching unit associated with the switching cable that connects the first antenna port to a second antenna port may be activated in order to establish an RF communication path from the first radio port to the second antenna port of the antenna. This action may occur only after determining that the second antenna port is not currently being utilized by any of the other radio ports.

The method 600 may be expanded to include multiple antennas as described in relation to FIG. 5. In this case, a status of each of the antennas is monitored in order to detect a change in the status. The change in the status may comprise, for example, an antenna becoming non-functional due to mechanical failure or due to incorrect positioning, and/or changes in UE traffic usage of a particular antenna. In response to detecting a change in status of, for example, a first antenna that is communicatively coupled to a first radio port, a communication instruction is sent to the switching device to cease communicatively coupling the first antenna to the first radio port and, instead, to communicatively couple the first radio port to a second antenna using one of the switching cables associated with the switching device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A switching device comprising:
   a housing unit comprising:
      a remote radio unit (RRU) inlet side having a plurality of radio port connecting terminals, wherein each radio port connecting terminal of the plurality of radio port connecting terminals is connected to a radio port of a RRU associated with a base station by a data transmission cable;
      an antenna inlet side having a plurality of antenna port connecting terminals, wherein each antenna port connecting terminal of the plurality of antenna port connecting terminals is connected to an antenna port of an antenna associated with the base station by a data transmission cable; and
      a plurality of sets of switching cables, each set of the plurality of sets of switching cables being associated with a radio port connecting terminal of the plurality of radio port connecting terminals, wherein each switching cable in the each set of switching cables connects the respective radio port connecting terminal to one of the plurality of antenna port connecting terminals, and wherein the each switching cable in the each set of switching cables comprises one or more switching units for selectively communicatively coupling the respective radio port connecting terminal to the one of the plurality of antenna port connecting terminals, wherein the switching device is interposed between the RRU and the antenna associated with the base station.

2. The switching device of claim 1, wherein the base station comprises an eNodeB.

3. The switching device of claim 1, wherein the data transmission cables are adapted to transmit and receive radio-frequency signals.

4. The switching device of claim 1, wherein the plurality of sets of switching cables is adapted to transmit and receive radio-frequency signals.

5. The switching device of claim 1, wherein the data transmission cables and the plurality of sets of switching cables comprise coaxial cables.

6. The switching device of claim 1, wherein the one or more switching units are controlled from a location remote from the base station.

7. The switching device of claim 6, wherein the one or more switching units are controlled remotely using standards developed by the Antenna Interfaces Standards Group (ASIG).

8. The switching device of claim 1, wherein the RRU inlet side is on a side of the housing unit that is opposite of the antenna inlet side.

9. A switching device comprising:
   a housing unit comprising:
      a remote radio unit (RRU) inlet side having a plurality of radio port connecting terminals, wherein each radio port connecting terminal of the plurality of radio port connecting terminals is connected to a radio port of a RRU associated with a base station by a data transmission cable;
      an antenna inlet side having a plurality of antenna port connecting terminals, wherein each antenna port connecting terminal of the plurality of antenna port connecting terminals is connected to one of a plurality of antennas associated with the base station by a data transmission cable; and
      a plurality of sets of switching cables, each set of the plurality of sets of switching cables being associated with a radio port connecting terminal of the plurality of radio port connecting terminals, wherein each switching cable in the each set of switching cables connects the respective radio port connecting terminal to one of the plurality of antenna port connecting terminals, and wherein the each switching cable in the each set of switching cables comprises one or more switching units for selectively communicatively coupling the respective radio port connecting terminal to the one of the plurality of antenna port connecting terminals, wherein the switching device is interposed between the RRU and the plurality of antennas associated with the base station.

10. The switching device of claim 9, wherein the base station comprises an eNodeB.

11. The switching device of claim 9, wherein each antenna of the plurality of antennas includes one or more antenna ports.

12. The switching device of claim 11, wherein the each antenna port connecting terminal of the plurality of antenna port connecting terminals is connected to an antenna port of the one or more antenna ports.

13. A computerized method carried out by at least one server having at least one processor for performing a method of regulating communication between an antenna and a remote radio unit (RRU) associated with a base station using a switching device, wherein the antenna comprises a plurality of antenna ports, the RRU comprises a plurality of radio ports, and the switching device communicatively couples the plurality of antenna ports with the plurality of radio ports using a plurality of switching cables, the method comprising:

monitoring a status of each antenna port of the plurality of antenna ports;

detecting, using the at least one processor, a change in the status of a first antenna port of the plurality of antenna ports, wherein the first antenna port is communicatively coupled via the switching device to a first radio port of the plurality of radio ports by a first switching cable of the plurality of switching cables, and wherein the switching device is interposed between the RRU and the antenna associated with the base station; and based on the change in the status of the first antenna port, communicating a first instruction to the switching device to cease communicatively coupling the first antenna port to the first radio port and to communicatively couple the first radio port to a second antenna port of the plurality of antenna ports using a second switching cable of the plurality of switching cables.

14. The computerized method of claim 13, wherein detecting the change in the status of the first antenna port comprises detecting a mechanical failure of the first antenna port.

15. The computerized method of claim 13, wherein detecting the change in the status of the first antenna port comprises detecting an interference problem associated with the first antenna port.

16. The computerized method of claim 13, wherein detecting the change in the status of the first antenna port comprises detecting a wiring error associated with the first antenna port.

17. The computerized method of claim 13, wherein the switching device further communicatively couples one or more additional antennas with the plurality of radio ports using the plurality of switching cables.

18. The computerized method of claim 17, further comprising:

monitoring a status of the one or more additional antennas;

detecting a change in the status of a first antenna of the one or more additional antennas, wherein the first antenna of the one or more additional antennas is communicatively coupled via the switching device to a second radio port of the plurality of radio ports by a third switching cable of the plurality of switching cables; and in response to detecting the change in the status of the first antenna of the one or more additional antennas, communicating a second instruction to the switching device to cease communicatively coupling the second radio port to the first antenna of the one or more additional antennas and to communicatively couple the second radio port to a second antenna of the one or more additional antennas.

19. The computerized method of claim 18, wherein detecting the change in the status of the first antenna of the one or more additional antennas comprises detecting that user equipment (UE) usage of the first antenna of the one or more additional antennas has decreased.

20. The computerized method of claim 18, wherein detecting the change in the status of the first antenna of the one or more additional antennas comprises detecting a mechanical failure associated with the first antenna of the one or more additional antennas.

* * * * *